United States Patent Office 3,491,062
Patented Jan. 20, 1970

---

3,491,062
EMULSIFIABLE POLYETHYLENE WAXES FROM OXIDIZED ETHYLENE-KETONE RESINS
Hugh J. Hagemeyer, Jr., and Windell C. Watkins, Longview, Tex., assignors to Eastman Kodak Company, Rochester, N.Y., a corporation of New Jersey
No Drawing. Filed Oct. 18, 1966, Ser. No. 587,407
Int. Cl. C08f 27/22, 15/12
U.S. Cl. 260—63                                9 Claims

ABSTRACT OF THE DISCLOSURE

An emulsifiable wax prepared by oxidizing a resin prepared from ethylene and ketones having the formula $$CH_3 - \overset{O}{\underset{\|}{C}} - R$$

wherein R is an alkyl radical having from two to six carbon atoms. This emulsifiable wax is useful for a variety of purposes such as in floor polishes and exhibits heretofore unobtainable properties such as hardness, melting point, density, thermal stability and emulsifiability.

---

This invention concerns new polyethylene type waxes having exceptional utility for a variety of purposes such as floor polishing, and exhibiting heretofore unobtainable and exceptional balances of properties such as hardness, melting point, density, thermal stability and emulsifiability.

Emulsifiable polyethylene type waxes may be prepared, for example, by thermally degrading high density polyethylene in a controlled manner, and then oxidizing the degraded polymer to a degree such that it can be emulsified. It has been found, however, that through the necessary oxidation procedure, considerable amounts of undesirable low molecular weight material is formed, apparently by excessive chain cleavage. The problem, of course, is how to get the degree of oxidation necessary for emulsifiability, without attendant detraction from desirable wax properties.

Objects of the present invention, therefore, are: to provide polyethylene type waxes which exhibit the aforesaid exceptional and heretofore unobtainable balance of properties; and to provide a commercially practicable process for preparing the same.

These and other objects hereinafter becoming evident have been attained in accordance with the present invention through the discovery that when resinous reaction products of ethylene and a methyl ketone of the general formula $$CH_3 - \overset{O}{\underset{\|}{C}} - R$$

wherein R is an alkyl radical of from two to six carbon atoms inclusive are treated with oxygen for a sufficient time to give a readily emulsifiable polyethylene type wax product, the amount of undesirable low molecular weight material formed is inconsequential and the product has the aforesaid excellent balance of properties which has been sought for so long in polyethylene type waxes. Exemplary R groups in the above formula are ethyl, n-propyl, n-butyl, iso-butyl, n-pentyl and n-hexyl.

Some of the improvements in properties obtained by the present invention are illustrated in the table below which compares one of the present oxidized resins with a known material.

|  | Oxidized degraded polyethylene | Oxidized ethylene/ methyl ketone resin |
|---|---|---|
| Viscosity at 125° C., cp | 320 | 255 |
| Penetration | 4.3 | 2.8 |
| Ring and ball softening point, ° C | 105 | 107 |
| Density | 0.904 | 0.948 |
| Stability, $R_3/R_0$ [1] | 4.1 | 1.5 |
| Emulsion transmittance, percent | 65 | 80 |
| Acid number | 15.2 | 15.0 |

[1] $R_3/R_0$ = Viscosity (125° C.) after 3 days at 125° C./Initial Viscosity (125° C.) at 125° C.

The above data shows the oxidized ethylene/methyl ketone resin to be harder, higher melting, denser, more thermally stable, and more easily emulsified than the oxidized degraded polyethylene. This is so even though they are of comparable molecular weight as evidenced by the viscosity.

The ethylene/methyl ketone resins particularly useful in the practice of the present invention may be characterized as follows:

Viscosity at 125° C., cp. _____ 200 to 8,000
Penetration (ASTM D5–52) _____ <0.1 to 8
Ring and ball softening point, ° C. (ASTM
  E28–51T) _____ 100 to 120
Cloud point, ° C. _____ 80 to 95
Density _____ 0.90 to 0.99
Carbonyl absorbance/cm. _____ 30 to 200

These resins may be prepared by reacting ethylene and a methyl ketone in the presence of from about 0.1 to about 2.0 mole percent of a free radical initiator based on the methyl ketone, and under pressures of from about 8,000 to about 30,000 p.s.i.g. The molar ratio of ethylene to methyl ketone, of course, increases during the reaction wherein the pressure in the system is maintained by continuous or periodic feeding of ethylene thereto, as is in Example 1 below. The temperature of the reaction system may be maintained between about 100 and about 280° C.

In preparing emulsifiable waxes of the present invention, the ethylene/methyl ketone resin is melted and held in a molten state at about 140° C. to about 165° C., preferably at about 150° C. With the resin at this temperature, oxygen-containing gas such as substantially pure oxygen or air is slowly bubbled through the resin mass with constant stirring. The length of time of the oxygen treatment is governed by such factors as degree of agitation and oxygen concentration within the resin mass. The degree of oxidation is readily determined by measuring the acid number of the resin melt, the amount of carboxyl radicals present at any point in the treatment being direct indication of the degree of oxidation. When a predetermined acid number is reached, the treatment is stopped and the molten oxidized wax is allowed to cool and solidify.

The resultant and preferred readily emulsifiable waxes may be characterized as follows:

Viscosity at 125° C., cp. _____ 200 to 4,000
Penetration (ASTM D5–52) _____ 0.1 to 8.0
Ring and ball softening point, ° C. (ASTM
  E28–51T) _____ 95 to 115
Density _____ 0.90 to 0.99
Stability $R_3/R_0$ _____ 1.3 to 2.5
Emulsion transmittance, percent _____ 60 to 90
Acid number _____ 12 to 20
Gardner color at 150° C. _____ 1— to 3

These viscosities correspond to molecular weights of from about 500 to about 5,000.

These waxes are useful for many purposes including the modification of petroleum waxes to improve the adhesion thereof, as aqueous emulsions capable of providing scuff-resistant, hard, glossy finishes on floors, tiles and the like, and as aqueous emulsions for enhancing the scuff resistance of such materials as permanently creased cotton fabrics.

The following examples are given in order to more fully illustrate, but not to limit, the present invention.

EXAMPLE 1

An 1800 ml. rocking autoclave is heated to 145° C. and sufficient ethylene is added to achieve a pressure of 8,000 p.s.i.g. Two hundred milliliters of methyl isobutyl ketone (MIBK) containing 0.8 ml. of di-tert.-butyl peroxide is added to the autoclave via a Ruska pump. When all of the MIBK-peroxide mixture has been added, the reaction is allowed to proceed for two hours, during which time the ethylene pressure is maintained at from 9,000 to 10,000 p.s.i.g. by adding compressed ethylene as needed. The molten product is pressured out of the autoclave by means of a dip tube and dried at 60° C. in a vacuum oven. The yield is 254 grams. The ethylene/MIBK resin is found to have the following properties:

| | |
|---|---|
| Viscosity at 125° C., cp. | 488 |
| Penetration | 2.5 |
| Ring and ball softening point, ° C. | 113.0 |
| Cloud Point, ° C. | 93.2 |
| Density | 0.9322 |
| Carbonyl absorbance/cm. | 85.0 |
| Molecular weight | 3,000 |

EXAMPLE 2

Two hundred and fifty grams of the resin produced in Example 1 is placed in a 500 ml., three neck round bottom flask equipped with an efficient stirrer, an outlet connected to a bubbler, and an oxygen inlet which extends to the bottom of the flask. The resin is melted and the temperature raised to 150° C. and maintained by an oil bath provided with a thermostat. Oxygen is added to the rapidly stirred mixture until the acid number of the melt reaches 15.0. The oxygen flow is then stopped and the wax is poured into a mold and allowed to cool and solidify. The wax is found to have the following properties:

| | |
|---|---|
| Viscosity at 125° C., cp. | 256 |
| Penetration | 2.8 |
| Ring and ball softening point, ° C. | 106.9 |
| Cloud point, ° C. | 80.2 |
| Density | 0.948 |
| Gardner color at 150° C. | 1+ |
| Stability $R_3/R_0$ | 1.50 |
| Emulsion transmittance, percent | 78 |

EXAMPLE 3

Using the procedure of Example 2, a sample of an ethylene/MIBK resin having a viscosity of 165 cp. at 125° C. and a carbonyl absorbance/cm. of 104 is oxidized to an acid number of 15.0. The wax is found to have the following properties:

| | |
|---|---|
| Viscosity at 125° C., cp. | 144 |
| Penetration | 3.0 |
| Ring and ball softening point, ° C. | 107.8 |
| Cloud point, ° C. | 77.4 |
| Density | 0.954 |
| Gardner color at 150° C. | 1+ |
| Stability, $R_3/R_0$ | 1.30 |
| Emulsion transmittance, percent | 81 |

EXAMPLE 4

An ethylene/MIBK resin having a viscosity of 400 cp. at 125° C. and a carbonyl absorbance/cm. of 70.5 is oxidized to an acid number of 15.3 according to the procedure of Example 2. The oxidized wax is found to have the following properties:

| | |
|---|---|
| Viscosity at 125° C., cp. | 220 |
| Penetration | 2.7 |
| Ring and ball softening point, ° C. | 111.6 |
| Cloud point, ° C. | 90.1 |
| Density | 0.929 |
| Gardner color at 150° C. | 1+ |
| Stability, $R_3/R_0$ | 1.57 |
| Emulsion transmittance, percent | 75 |

EXAMPLE 5

A sample of an ethylene/MIBK resin having a viscosity of 150 cp. at 125° C. and a carbonyl absorbance/cm. of 86.5 is oxidized by the procedure of Example 2 to an acid number of 13.8. The product is found to have the following properties:

| | |
|---|---|
| Viscosity at 125° C., cp. | 119 |
| Penetration | 7.0 |
| Ring and ball softening point, ° C. | 74.6 |
| Density | 0.938 |
| Gardner color at 150° C. | 1+ |
| Stability, $R_3/R_0$ | 1.23 |
| Emulsion transmittance, percent | 78 |

EXAMPLE 6

An ethylene/methyl ethyl ketone (MEK) resin having a viscosity of 77 cp. at 125° C. and a carbonyl absorbance/cm. of 108.5 is oxidized to an acid number of 14.5 by the procedure of Example 2. The properties of this wax are the following:

| | |
|---|---|
| Viscosity at 125° C., cp. | 64 |
| Penetration | 20.4 |
| Ring and ball softening point, ° C. | 103.2 |
| Cloud point, ° C. | 73.5 |
| Density | 0.9412 |
| Gardner color at 150° C. | 1− |
| Stability, $R_3/R_0$ | 1.31 |
| Emulsion transmittance, percent | 83 |

EXAMPLE 7

As ethylene/MEK resin having a viscosity of 525 cp. at 125° C. and a carbonyl absorbance/cm. of 82.7 is oxidized to an acid number of 19.3 by the procedure of Example 2. The properties of this wax are found to be the following:

| | |
|---|---|
| Viscosity at 125° C., cp. | 170 |
| Penetration | 4.5 |
| Ring and ball softening point, ° C. | 110.0 |
| Cloud point, ° C. | 94.3 |
| Density | 0.9564 |
| Gardner color at 150° C. | 1 |
| Stability $R_3/R_0$ | 2.38 |
| Emulsion transmittance, percent | 86 |

EXAMPLE 8

An ethylene/MEK resin having a viscosity of 180 cp. at 125° C. and a carbonyl absorbance/cm. of 86.0 is oxidized to an acid number of 15.2 by the procedure of Example 2. The oxidized wax is found to have the following properties:

| | |
|---|---|
| Viscosity at 125° C., cp. | 122 |
| Penetration | 9.5 |
| Ring and ball softening point, ° C. | 102.2 |
| Cloud point, ° C. | 78.8 |
| Density | 0.9412 |
| Gardner color at 150° C. | 1 |
| Stability, $R_3/R_0$ | 1.38 |
| Emulsion transmittance, percent | 80 |

EXAMPLE 9

An ethylene/MEK resin having a viscosity of 45 cp. at 125° C. and a carbonyl absorbance/cm. of 152 is oxidized to an acid number of 16.2 according to the procedure of Example 2. The wax is found to have the following properties:

| | |
|---|---|
| Viscosity at 125° C., cp. | 54 |
| Penetration | 23.2 |
| Ring and ball softening point, ° C. | 100.2 |
| Cloud point, ° C. | 73.2 |
| Density | 0.9373 |
| Gardner color at 150° C. | 1— |
| Stability, $R_3/R_0$ | 1.30 |
| Emulsion transmittance, percent | 82 |

EXAMPLE 10

An ethylene/MIBK resin having a viscosity of 1,000 cp. at 125° C. and a carbonyl absorption/cm. of 57.6 is oxidized in a continuous unit at 150° C. and 90 p.s.i.g. air pressure to an acid number of 14.5. The resulting emulsifiable wax is found to have the following properties:

| | |
|---|---|
| Viscosity at 125° C., cp. | 440 |
| Penetration | 2.1 |
| Ring and ball softening point, ° C. | 103.8 |
| Cloud point, ° C. | 74.4 |
| Density | 0.9362 |
| Gardner color at 150° C. | 1 |
| Stability, $R_3/R_0$ | 1.65 |
| Emulsion transmittance, percent | 75 |

The invention has been described in considerable detail with particular reference to preferred embodiments thereof, but it will be understood that variations and modifications can be effected within the spirit and scope of the invention as described hereinabove and as defined in the appended claims.

We claim:
1. As a new composition of matter, an emulsifiable wax prepared by the oxidation of a resinous reaction product of ethylene and a ketone of the general formula

$$CH_3-\overset{O}{\underset{\|}{C}}-R$$

wherein R is an alkyl radical having from two to six carbon atoms inclusive and having a penetration of 0.1 to 8.0, a ring and ball softening point of 95–115, a density of 0.90–0.99, a stability of $R_3$ to RO of 1.3 to 2.5, and an acid number of 12 to 20.

2. The emulsifiable wax of claim 1 wherein the ketone is methyl ethyl ketone.
3. The emulsifiable wax of claim 1 wherein the ketone is methyl n-propyl ketone.
4. The emulsifiable wax of claim 1 wherein the ketone is methyl isobutyl ketone.
5. The emulsifiable wax of claim 1 wherein the ketone is methyl n-hexyl ketone.
6. A process for preparing an emulsifiable wax from a resinous reaction product of ethylene and ketone of the general formula $$CH_3-\overset{O}{\underset{\|}{C}}-R$$

wherein R is an alkyl radical having two to six carbon atoms which comprises melting said resinous reaction product by heating to a temperature of 140 to 165° C. and oxidizing the molten resinous reaction product to the desired acid number.
7. The process of claim 6 wherein said oxidation is accomplished by treating said resin with an oxygen-containing gas.
8. The process of claim 7 wherein the oxygen-containing gas is oxygen.
9. The process of claim 7 wherein the oxygen-containing gas is air.

References Cited

UNITED STATES PATENTS

| 2,484,529 | 10/1949 | Roedel | 260—63 XR |
| 3,052,662 | 9/1962 | Shiraishi et al. | 260—63 XR |
| 3,083,184 | 3/1963 | Loeb | 260—63 |
| 3,156,682 | 11/1964 | Kirk et al. | 260—94.9 |
| 2,902,376 | 9/1959 | Beacher et al. | 106—10 |
| 3,243,310 | 3/1966 | Hull et al. | 106—270 |

WILLIAM H. SHORT, Primary Examiner

L. M. PHYNES, Assistant Examiner

U.S. Cl. X.R.

260—66, 410, 413